United States Patent [19]

Klevecz

[11] Patent Number: 4,834,899

[45] Date of Patent: May 30, 1989

[54] METHOD FOR PREVENTING FROST DAMAGE TO PLANTS

[76] Inventor: Robert R. Klevecz, 3139 Mount Curve, Altadena, Calif. 91001

[21] Appl. No.: 93,768

[22] Filed: Sep. 8, 1987

[51] Int. Cl.$^4$ ................................................. C09K 3/18
[52] U.S. Cl. .......................................... 252/70; 47/2; 47/58; 106/13; 424/665; 514/557
[58] Field of Search ............................ 252/70; 106/13; 424/149; 47/2; 47/58; 514/557

[56] References Cited

U.S. PATENT DOCUMENTS 4,084,747  4/1978  Alliger .................................... 424/65
4,161,084  7/1979  Arny et al. ............................... 47/58
4,601,842  7/1986  Caple et al. ............................ 252/70

OTHER PUBLICATIONS

Lindow et al., "Reduction of Frost Injury to Almond by Control of Ice Nucleation Active Bacteria," J. Am. Soc. Hatic. Sci. 1984, 109(1), 48–53, (CA 100:134154v).

Primary Examiner—Robert A. Wax
Attorney, Agent, or Firm—Edward S. Irons

[57] ABSTRACT

A method for preventing frost damage to plants, comprising applying a bactericide to the surfaces of the plants in an amount sufficient to effectively eliminate several species of ice-nucleation active (INA) bacteria, thereby reducing the temperature at which frost damage occurs.

18 Claims, No Drawings

METHOD FOR PREVENTING FROST DAMAGE TO PLANTS

BACKGROUND OF THE INVENTION

This invention relates to methods for protecting plants from frost damage.

The growing season, usually expressed as the number of frost-free days, is the determining factor of the agricultural usefulness of land. When plants are exposed to freezing conditions due to an abnormal fluctuation of the average temperatures during the growing season, temporary or permanent damage to the plants is likely to occur. Frost damage to plants occurs when ice forms from the intracellular liquid in the plant tissues. In cases where frost formation is heavy, ice rapidly spreads through the entire structure, causing the breakdown of cell walls and cell membranes. This disruption of the plant tissues can lead to bud or fruit loss or the death of the plant.

Conventional methods of frost protection involve maintaining the temperature of plant tissues above the freezing point of water. Such traditional methods for frost control are either: (1) capital intensive, as in the case of wind machines or helicopters; (2) wasteful, polluting, and prohibited by air quality control agencies in many areas, as in the case of smudge pots; or (3) have limited applicability, as in the case of over- or under-tree water application in dry, windy areas. Moreover, these methods of control cannot be practiced on a convenient work schedule in advance of frost threat, and are often ineffective and difficult to calibrate.

It is known that water can be supercooled to temperatures below 0° C. without freezing. Supercooled water will freeze upon the spontaneous formation or addition of a catalyst for the water-ice phase transition. Such catalysts are known as ice nuclei. In the absence of ice nuclei, the temperature at which frost damage occurs is renduced to temperatures a few degrees below 0° C. (−5.5° to −9° C.).

Recently, researchers have discovered that certain bacteria, particularly *Erwinia herbicola* and *Pseudomonas syringae*, can act as ice nuclei and are known as ice-nucleation active (INA) bacteria. INA bacteria are present on plant surfaces, such as leaves, buds and blossoms, at their lowest levels in the late summer and fall; they begin to increase in February, and reach their maximum levels in March–April in the Northern Hemisphere. The presence of these INA bacteria on plant surfaces causes ice nucleation in the laboratory at temperatures 5° to 8° C. warmer than in the absence of the INA bacteria. Consequently, the presence of INA bacteria on crops leads to increased danger of frost damage at the most critical time of the growing season. Such findings have led to attempts to inhibit the ice-nucleating activity of INA bacteria as a method for increasing the tolerance of plants to freezing temperatures.

Certain bactericides, such as antibiotics, have been known to provide an effective control of INA bacterial populations. See, Lindow, et al., *J. Amer. Soc. Hort. Sci.* 109(1): 48–53 (1984).

Other bactericides, such as hypochlorite (bleach), Bordeaux mixes (copper sulfate), and copper sprays, are generally used to treat other types of agricultural maladies.

To make use of the knowledge concerning the presence of INA bacteria, several new frost prevention approaches have been proposed. These methods take advantage of the fact that only a small percentage, usually less than 10%, of the total bacteria found on plant surfaces are INA bacteria. See, Lindow, "Epiphytic Ice Nucleation-Active Bacteria," *Phytopathogenic Prokaryotes*, Vol. 1, ch. 14, pp. 335–362 (1982). These approaches generally utilize antagonistic behavior of the remaining bacteria as they compete for a position on the plant surface.

U.S. Pat. No. 4,432,160 to Lindow describes the application of nucleation deficient microorganisms to plants to inhibit the presence and establishment of ice nucleation capable bacteria. These antagonistic microorganisms use at least one nutrient from the plant also used by the ice nucleation capable bacteria, thereby assuring the elimination of such bacteria. Likewise, U.S. Pat. Nos. 4,045,910 and 4,161,084 to Arny, et al. describe the addition of non-ice nucleating bacteria to plants prior to the onset of freezing temperatures.

Another frost prevention method involves the use of non-phytotoxic virulent bacteriophages. U.S. Pat. No. 4,375,734 to Kozloff, et al. describes the application of such bacteriophages on the plant surfaces to selectively attack the ice-nucleating bacteria and inhibit their activity.

Recent advances in the role of INA bacteria in ice formation have led to the development of antagonistic organisms genetically altered to lack enucleation capacity (INA-).

SUMMARY OF THE INVENTION

In general, the invention features a method for preventing frost damage to plants comprising applying a bactericide to the surfaces of the plants in an amount sufficient to prevent ice nucleation by several species of ice nucleation active (INA) bacteria, thereby reducing the temperature at which frost damage occurs. In some preferred embodiments, the bactericide is an aqueous solution comprising at least one chlorite of the alkali metal or alkaline earth metal groups having a pH of about 7. In other preferred embodiments the bactericide solution further comprises at least one water soluble organic acid and has a pH of about 1.5 to less than about 7. The concentration of chlorite in the bactericide solutions is 1000–3000 ppm. In other preferred embodiments the alkali metal or alkaline earth metal chlorites are potassium chlorite, sodium chlorite, and calcium chlorite; water soluble organic acids are lactic acid and acetic acid.

Other advantages and features of the invention will be apparent from the following description of the preferred embodiment, and from the claims.

DESCRIPTION OF THE PREFERRED EMBODIMENT

According to the methods of the present invention, INA bacteria are killed or otherwise rendered ineffective to nucleate ice on plant surfaces by applying certain bactericides. These bactericides comprise aqueous solutions of chlorites wherein said solutions have pH's of about 7, and chlorite-organic acid aqueous solutions, such that the pH of a given solution is in the range of about 1.5 to less than about 7, but preferably is in the range of about 3 to about 5. Chlorite compounds used in accordance with the present invention include (1) at least one alkali metal chlorite; (2) at least one alkaline earth metal chlorite; or (3) a combination of at least one alakali metal chlorite and at least one alkaline earth metal chlorite. Potassium chlorite, sodium chlorite, and calcium chlorite are preferred. In general, the preferred concentration of chlorite compound in the final bactericide solution is between about 1000 and about 3000 ppm.

The organic acid component of the bactericidal compositions used in accordance with the methods of this invention comprises one or more water soluble organic acids. Suitable organic acids by way of example include acetic, citric, sorbic, fumaric, tannic, malic, tartaric, ascorbic, succinic, boric, oxalic, or other structurally similar acids. The use of lactic acid in combination with the chosen chlorite compound or compounds is preferred.

The bactericide compositions of this invention should be applied to frost-sensitive plants by spraying the plant surfaces until they are covered and excess bactericide begins to drip off.

The following examples illustrate the effectiveness of the frost prevention methods of this invention. Specifically, they illustrate the average number of fruit per tree produced after single and weekly applications of various bactericides during the beginning of the growing season.

EXAMPLE 1

In spring 1986, blocks of 50 peach trees were sprayed with a solution of either 2000 ppm sodium hypochlorite (NaOCl) and 200 ppm tetracycline, or a sodium chlorite-organic acid aqueous solution comprising 2000 ppm sodium chlorite ($NaClO_2$) in 3% lactic acid.

The sodium hypochlorite-tetracycline solution was applied to one block of trees once early in the growing season; the sodium chlorite-lactic acid was similarly applied to another block of trees. The sodium hypochlorite-tetracycline solution was also applied four times at weekly intervals to a separate block of trees until the end of frost danger; the sodium chlorite-lactic acid solution was similarly applied to another block of trees. Unsprayed blocks of peach trees were used as controls.

In spring 1987, blocks of 50 peach trees were sprayed with either a solution comprising 2000 ppm sodium hypochlorite and 200 ppm chlorotetracycline, or a sodium chlorite-acid aqueous solution comprising 2000 ppm sodium chlorite in 1% lactic acid at pH 3.6.

The sodium hypochlorite-chlorotetracycline solution was applied to one block of trees one time early in the growing season; the sodium chlorite-lactic acid solution was similarly applied to another block of trees. The sodium hypochlorite-chlorotetracycline solution was also applied four times at weekly intervals to a separate block of trees until the end of frost danger; the sodium chlorite-lactic acid solution was similarly applied to another block of trees. Unsprayed blocks of peach trees were used as controls.

The results appear below in Table I.

TABLE I

| AVERAGE NUMBER OF FRUIT PER TREE | | |
|---|---|---|
| | Single Application at Full Bloom | Weekly Applications |
| Spring 1986 | | |
| Unsprayed (no frost prevention) | 9 | — |
| NaOCl - 2000 ppm Tetracycline - 200 ppm | 219 ± 54 | 277 ± 39 |
| $NaClO_2$ - 2000 ppm in 3% lactic acid | 256 ± 67 | — |
| Spring 1987 | | |
| Unsprayed (no frost prevention) | 0.6 | — |
| NaOCl - 2000 ppm Chlorotetracycline - 200 ppm | 383 | 412 |
| $NaClO_2$ - 2000 ppm in 1% lactic acid | 441 | 488 |

The results of these experiments show that peach trees treated with the sodium chlorite-lactic acid solutions produced a higher average of peaches per tree than those trees treated with sodium hypochlorite-tetracycline/chlorotetracycline. Without any spraying of the peach trees, nearly the entire crop was lost. Weekly applications of the bactericidal solutions resulted in a slightly higher percentage of surviving peaches.

These results indicate a statistically significant amount of frost damage is prevented by the methods employed in the present invention.

EXAMPLE 2

Blocks of 50 peach trees are sprayed with a bactericide comprised of potassium chlorite ($KClO_2$) in lactic acid. The concentration of the potassium chlorite is 1000–3000 ppm, and the pH of the resulting solution is preferably in the range of 3–5. The bactericidal composition comprises 2000 ppm potassium chlorite in 1% lactic acid at a pH of 3.6.

Certain blocks of peach trees are given a single application of a potassium chlorite-lactic acid solution comprising 2000 ppm potassium chlorite in 1% lactic acid at pH 3.6. Certain other blocks are sprayed four times at weekly intervals until the end of frost danger. Another block of peach trees is not treated and serves as a control.

The resulting yields of fruit per tree so treated are similar to those trees treated with sodium chlorite-lactic acid in Example 1. The advantage of using potassium chlorite is that plants tolerate potassium better than most other alkali metals or alkaline earth metals.

Particularly in cases when threat of frost damage is likely to be of short duration, a bactericide solution comprising 1000–3000 ppm of at least one chlorite of the alkali earth metals (potassium, sodium); at least one of the alkaline earth metal chlorites (calcium); or a combination of at least one of each of the alkali metal and alkaline earth metal chlorites in water, wherein the pH of the resulting solution is about 7, can be applied to plants to prevent ice nucleation. For example, an aqueous solution containing a mixture of potassium chlorite and calcium chlorite can be used.

The bactericide compositions of the present invention were sprayed on peach trees at the beginning of the growing season when the trees were at full bloom. However, in some instances it is advantageous that the bactericides also be applied at times earlier than the time of full bloom, depending on the level of INA bacteria present. The bactericide compositions were also sprayed at weekly intervals from the time the trees were in full bloom until there was no longer a threat of frost damage. One of the reasons for such repeated applications of the present bactericides is that inherent in the procedure of spraying plants, such as fruit trees or other complex vegetation, is the possibility that one application of bactericide will not reach all exposed surfaces of the plant, such as buds, flowers, and undersides of leaves. Another reason is that INA bacteria can be easily transferred among plants, e.g., by birds and insects. Therefore, several applications of the present bactericide compositions may be necessary to prevent ice nucleation by the INA bacteria on the plant surfaces.

The appropriate application procedure is dependent on the progress of the INA bacteria repopulation of the plant surfaces in cases where the total bacterium population is not totally rendered ineffective by prior application of bactericide. If the INA bacteria repopulation of the plant surface is slow, a single spraying can be sufficient to prevent frost damage. If repopulation following initial treatment is rapid, a marked increase in the amount of frost damage would be counteracted by increasing the number of applications of the bactericide composition of the present invention.

The methods of preventing frost damage in plants, according to this invention, may be employed with a wide variety of crop and ornamental plants. In addition to peach trees, the methods of the present invention can be used on pear, cherry, orange, grapefruit, and other fruit and citrus trees. The methods of this invention can also be used with other plant varieties, such as leafy vegetables with bush fruits. The frost prevention method of this invention further allows such plant varieties to be grown on nonproductive land in frost-prone areas and land at higher elevations not normally used for growing crops. Use of more land at higher elevations is beneficial, for example, to fruit orchards because fruit trees grown at high elevations can produce fruit of exceptional quality with high color, high sugar and organic acid content, and greater complexity of taste.

What is claimed is:

1. A method for preventing frost damage to plants, comprising:
applying an inorganic chlorite bactericide in an amount sufficient to effectively prevent ice nucleation by several species of ice-nucleation active (INA) bacteria, thereby reducing the temperature at which frost damage occurs.

2. The method of claim 1 wherein said bactericide is an aqueous solution comprising at least one chlorite of an alkali metal, at least one chlorite of an alkaline earth metal, or a combination of at least one alkali metal chlorite and at least one alkaline earth metal chlorite.

3. The method of claim 2 wherein said bactericide solution further comprises at least one water soluble organic acid.

4. The method of claim 2 wherein said chlorite is potassium chlorite.

5. The method of claim 3 wherein said chlorite is potassium chlorite.

6. The method of claim 2 wherein said chlorite is sodium chlorite.

7. The method of claim 3 wherein said chlorite is sodium chlorite.

8. The method of claim 2 wherein said chlorite is calcium chlorite.

9. The method of claim 3 wherein said chlorite is calcium chlorite.

10. The method of any of claims 2-9 wherein the concentration of said chlorite is between about 1000 and about 3000 ppm of the final bactericide solution.

11. The method of claims 3, 5, 7, or 9 wherein said organic acid is lactic acid.

12. The method of claims 3, 5, 7, or 9 wherein said organic acid is acetic acid.

13. The method of claims 3, 5, 7, or 9 wherein the pH of said bactericide solution is between about 1.5 and less than about 7.

14. The method of claims 3, 5, 7, or 9 wherein the pH of said bactericide solution is between about 3 and about 5.

15. The method of claims 2, 4, 6, or 8 wherein the pH of said bactericide solution is about 7.

16. The method of claim 1 wherein said bactericide is applied by spraying said bactericide on said plants at the beginning of the growing season.

17. The method of claim 1 wherein said bactericide is applied by spraying said bactericide on said plants when said plants are in full bloom.

18. The method of claim 1 wherein said bactericide is applied by spraying said bactericide on said plants several times from the time INA bacteria begin to increase on said plants in the beginning of the growing season until there is no longer a threat of frost damage.

* * * * *